United States Patent Office 3,242,013
Patented Mar. 22, 1966

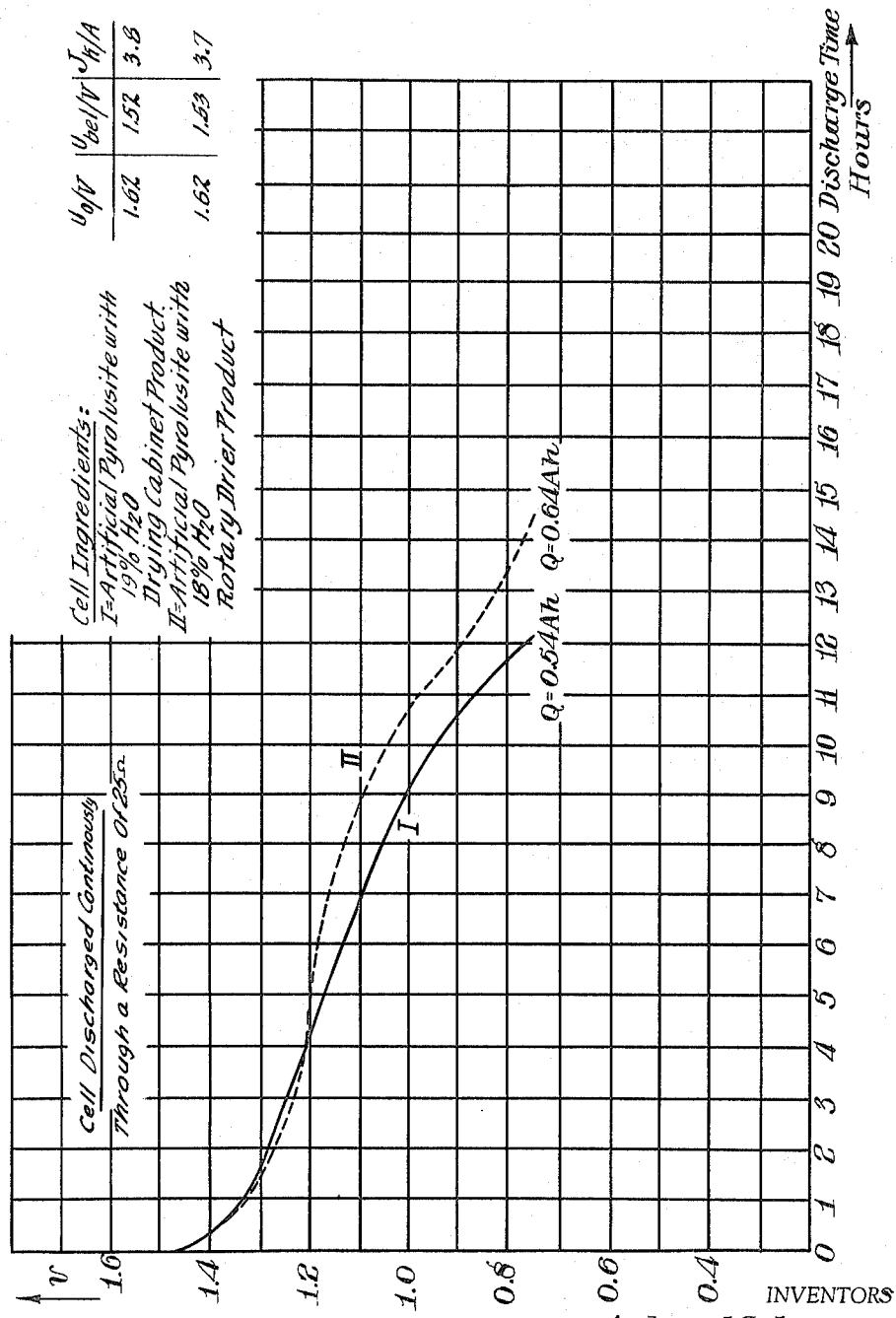

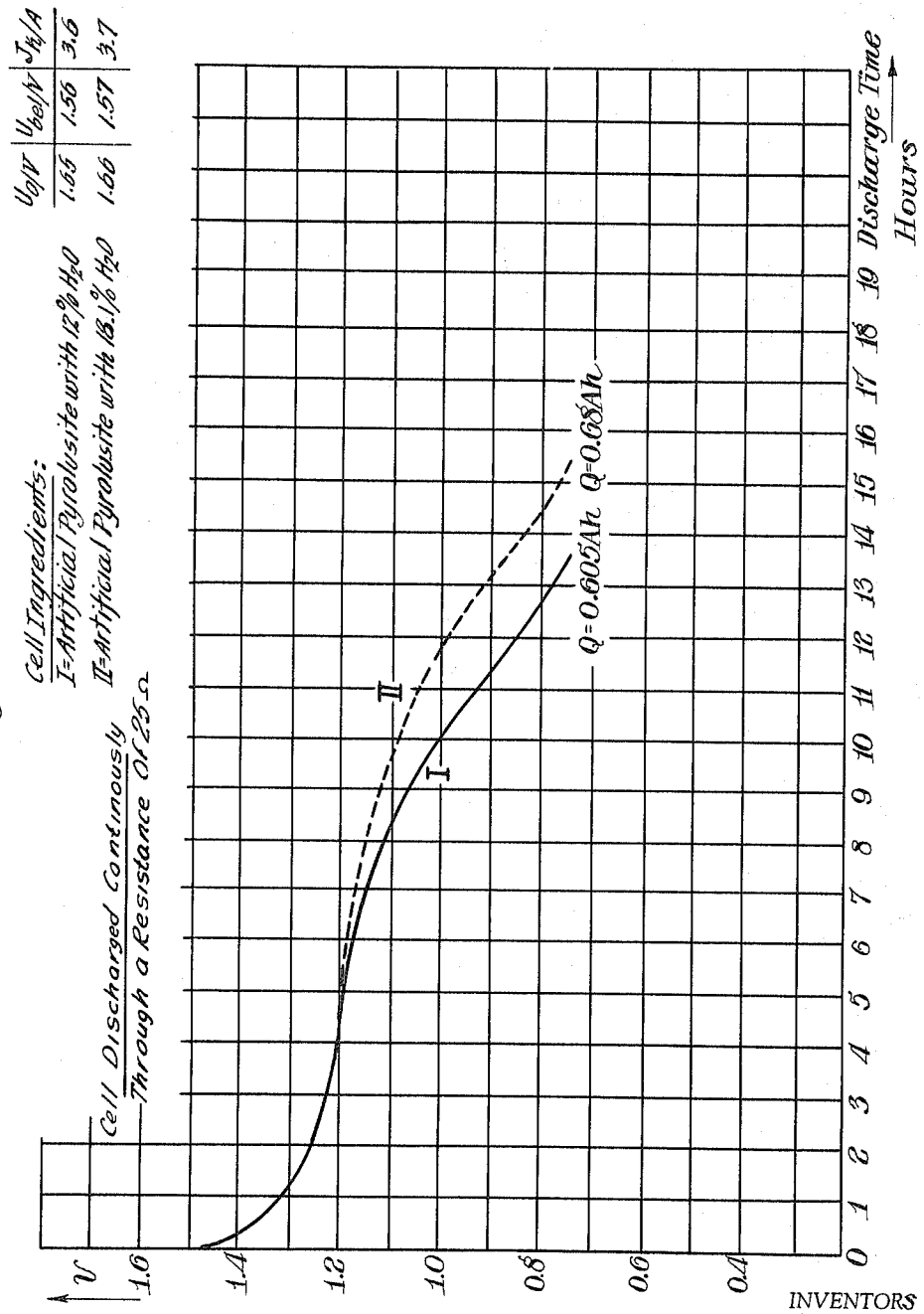

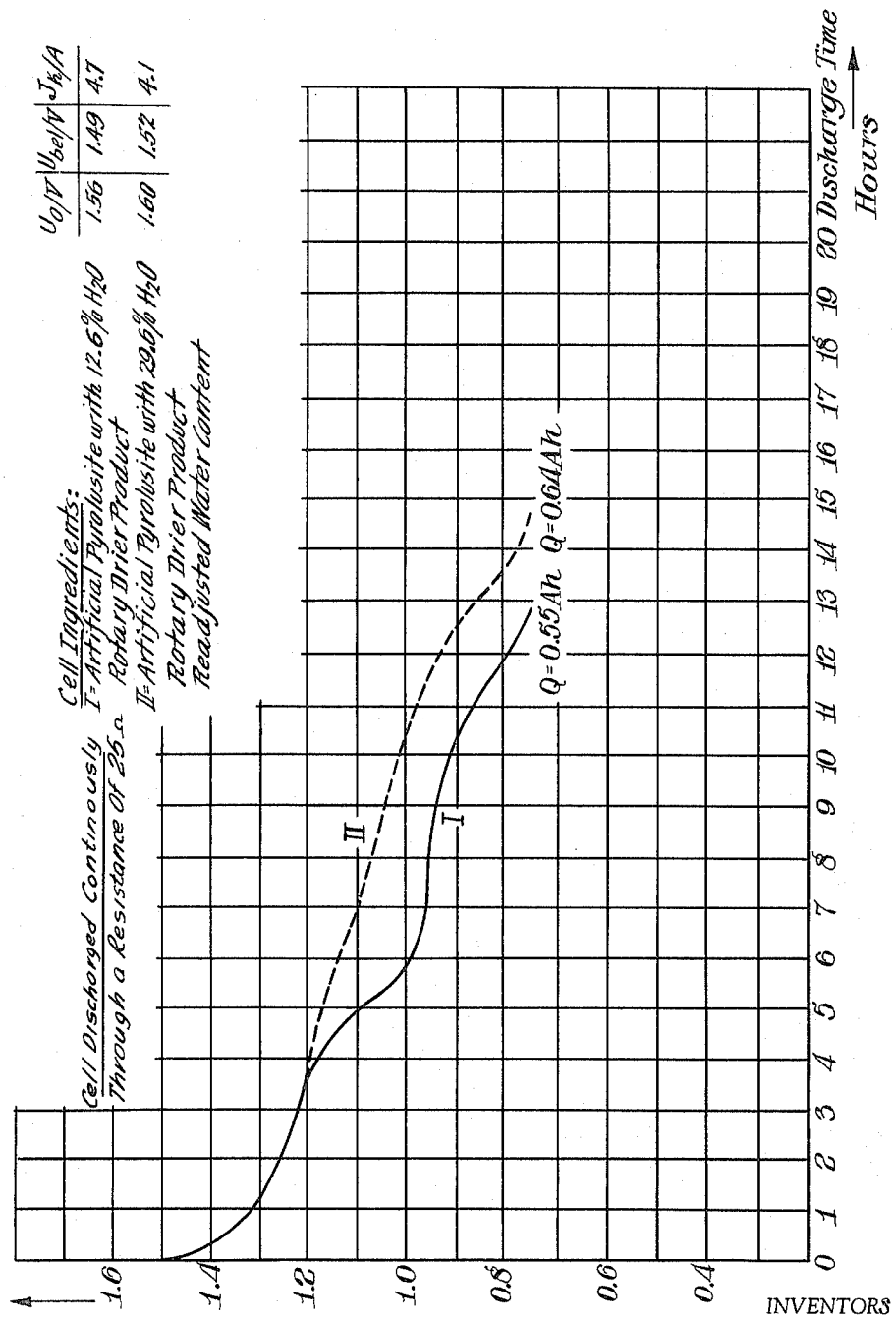

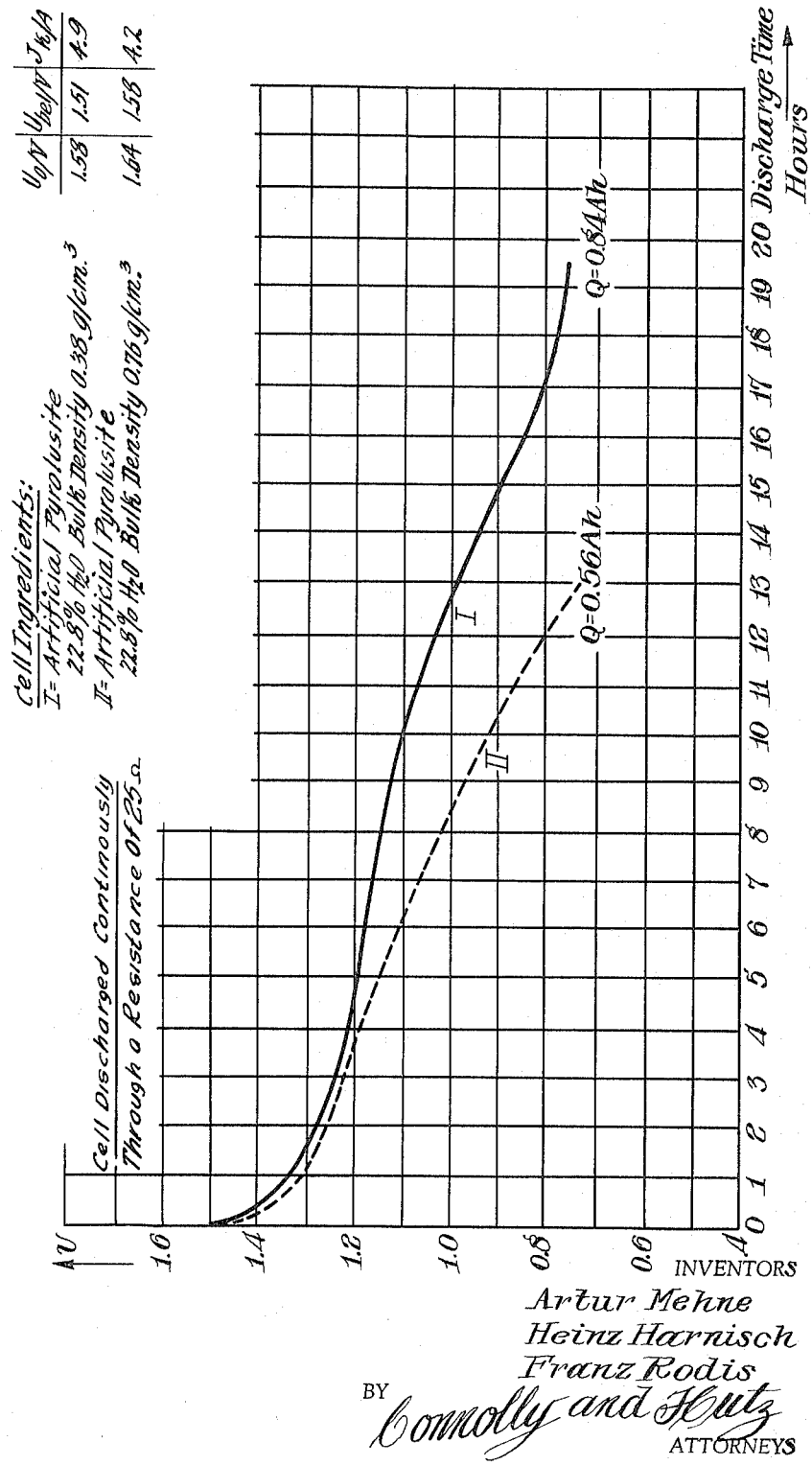

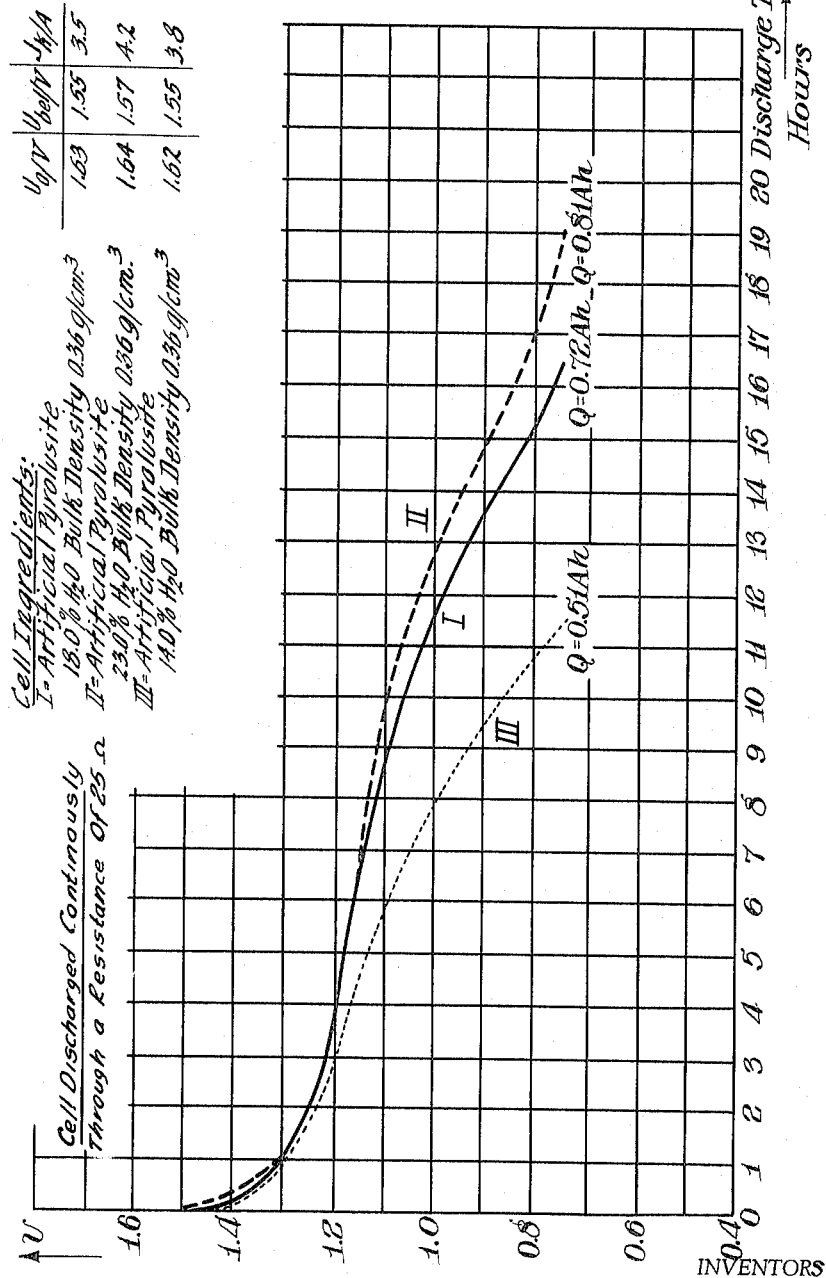

3,242,013
DRY CELL BATTERIES WITH A PYROLUSITE DEPOLARIZING AGENT
Artur Mehne, Efferen, near Cologne, Heinz Harnisch, Lovenich, near Cologne, and Franz Rodis, Bad Hersfeld, Germany, assignors to Knapsack-Griesheim Aktiengesellschaft, Knapsack, near Cologne, Germany, a corporation of Germany
Filed Aug. 17, 1962, Ser. No. 217,758
Claims priority, application Germany, Aug. 19, 1961, K 44,532; Sept. 14, 1961, K 44,714
5 Claims. (Cl. 136—138)

The present invention relates to a process for finishing artificial pyrolusites produced in known manner for use as a depolarizing agent in dry batteries. The term "artificial pyrolusites" as used herein is intended to mean products which are precipitated by chemical means from manganese salt solutions with the aid of an oxidizing or reducing agent.

Thus, it is known, for example, to prepare artificial pyrolusite which is used as a depolarizing agent in dry batteries, by oxidizing a solution of bivalent manganese salts, such as $MnCl_2$, $MnSO_4$ or $Mn(NO_3)_2$. The oxidizing agents used include, for example, chlorine or hypochlorites.

It is also known that pyrolusite, such as obtained in the manufacture of saccharin by reduction of potassium permanganate, can be used as a depolarizing agent.

In these processes, the pyrolusite is precipitated from the reaction solutions by filtration and washing and obtained in the form of a paste or a filter-cake, which still contains about 60 to 90% by weight water.

It has now unexpectedly been found that the quality of pyrolusite in its capacity as a depolarizing agent for use in dry batteries is decisively influenced by various factors. In dehydrating pyrolusite containing 60 to 90% water, it has been found, for example, that the battery properties of the dehydrated product are a function of its water content and a function of the manner in which such water content is adjusted.

During the dehydration to an advantageous water content care must be taken to ensure that the pyrolusite in the form of a filter-cake or a paste, for example, is rather uniformly dehydrated, especially in the last phase of dehydration. In other words, it should be avoided that portions of the pyrolusite mass possess a water content lower than desired, while other portions thereof still exhibit to high a content of water. This is achieved best by finely distributing the pyrolusite paste or filter-cake during dehydration and taking care that the formation of relatively large agglomerates, especially in the final phase of the dehydration, is avoided.

All the $MnO_2$ particles should advantageously remain in the dehydrating medium, for example hot air, for about the same period of time, and the product to be dehydrated should be constantly mixed by agitation during the dehydration. Furthermore, the product to be dehydrated should not have too high a temperature during the dehydration. The temperature, if at all possible, should not exceed 150° C. and advantageously vary between 65 and 120° C. The products obtained in the examples described below were all dehydrated, for example, at temperatures within the range of 70 to 100° C.

The dehydration in the state of rest or the dehydration for too long a period of time of pyrolusite in the form of a paste or filter-cake at elevated temperatures down to a water content of about 12 or even 10%, results in the formation of products which are all rather inappropriate for use in batteries. On the contrary, products very suitable for use in batteries are obtained by dehydrating the pyrolusite used as the starting material to a total water content within the range of 15 to 35%, preferably 18 to 25 the best results being obtained with dehydrated products containing 20–23% water. The products containing such amounts of water have a dry dust-like handle, even when comminuted to powder form.

The dehydration being at least partially reversible, those products which have been dehydrated to too great an extent or contain less than 15% water content and which, therefore, are less qualified to serve as a depolarizing agent, can be improved in quality to some extent by increasing their water content subsequently to the desired value. This is most advantageously achieved by treating them with steam or steam-containing gases at ambient temperature, or preferably at slightly elevated temperatures.

The subsequent adjustment of the water content to the desired value by adding water in liquid form is less favorable, because it is rather difficult to distribute the water homogeneously over the whole outer and inner surface of the individual pyrolusite particles. In this case, it is advantageous, after the addition of water, to store the product for some time or more advantageously to homogenize it for a prolonged time in a mixing device.

The dehydration is advantageously carried out in an apparatus similar to a drum or rotary drier, some balls of porcelain or another appropriate material being introduced into the drum or rotary drier together with the material to be dehydrated, which avoid the formation of agglomerates especially effectively. Any other suitable apparatus may, however, also be used for carrying out the dehydration.

FIGURES 1–5 of the drawing illustrates the discharge characteristics of dry cell batteries according to the invention in comparison with dry cell batteries having a pyrolusite depolarizing agent falling outside of the critical limits defined by the invention.

In the accompanying drawings FIG. 1 illustrates the mean discharge curves of three cells, one of which was prepared while using pyrolusite dehydrated in a drying cabinet at 80° C. (drying in the state of rest; curve I), while the remaining two cells were prepared while using pyrolusite dehydrated at approximately the same temperature in a drum or rotary drier (drying with distribution and mixing) of the type described above (curve II). The pyrolusite was dried for 24 hours in the drying cabinet, and for 3 hours in the drum or rotary drier. After dehydration, the two types of pyrolusite contained approximately the same amount of water (18 and 19%, respectively). Notwithstanding that the pyrolusite dehydrated in the drying cabinet contained even some more water than the pyrolusite dehydrated in the drum or rotary drier, the former is of poorer quality. Such poorer quality must be attributed to the more inhomogeneous dehydration in the drying cabinet of the pyrolusite in paste or filter-cake form used as the starting material. In the drying cabinet the pyrolusite is dehydrated on sheets in relatively thick resting layers, whereas in the drum or rotary drier the pyrolusite is dehydrated while being constantly divided and mixed.

In the diagrams indicated in FIGS. 1 to 5 of the accompanying drawings are plotted on the ordinate the voltage and on the abscissa the time. The cells were continuously discharged through a resistance of 25 ohm. The various symbols used in the diagrams have the following meanings:

$U_0/V$ = initial voltage uncharged;
$U_{bel}/V$ = initial voltage under charge;
$J_k/A$ = short circuit intensity.

The diagram of FIG. 2 represents the mean discharge curves of three cells each which were prepared while using (a) pyrolusite dehydrated to a water content of 12% (curve I), and (b) pyrolusite dehydrated to an extent of only 18.1% (curve II).

The drying temperature was at 70° C. in either case. The first product (a) was dried for 4.5 hours and the second product (b) for 2.5 hours. The diagram indicates that the delay or running time of the product dehydrated to a water content of 12% until voltage drop to 0.75 volt is substantially shorter than that of the product dehydrated to an extent of 18.1%. The capacity Q of the cells is 0.64 ah. in curve I (product containing 12.0% $H_2O$) and 0.685 ah. in curve II (product containing 18.1% HO). The limiting voltage used for the determination of the capacity was again 0.75 volt.

The diagram of FIG. 3 represents the discharge curves of cells prepared (a) with a pyrolusite preparation, which had been dehydrated at 100° C. in a drum drier to a residual water content of 12.6% and then used in the battery (curve I), and (b) with a second pyrolusite preparation which after the drying at 100° C. had been readjusted to a water content of 29.6% by treatment with steam-containing air at ambient temperature (curve II). The diagram indicates that the product after-treated with steam-containing air behaves substantially better in the battery than the product not-aftertreated. The capacities of the cells are indicated in FIG. 3.

It is, however, more advantageous directly to adjust the water content found to be advantageous according to this invention during the dehydration rather than first to subject the products to strong dehydration and then to readjust such advantageous water content. This should not only be done for reasons pertaining to apparatus but also for the reason that it is often impossible to again attain by subsequent treatment the same quality as obtained by direct treatment. The dehydration described above leads to products of especially good quality when applied to pyrolusite preparations which have been obtained by oxidizing manganese-II-salt solutions with chlorine or hypochlorites in the vicinity of the neutral point, for example at a pH value within the range of 5 to 8, preferably 7 to 8. Under these conditions, the pyrolusite is not only obtained in the $\gamma$- or $\delta$-form desired for depolarization; it also possesses the porous, fissured and fine particle structure so favorable for the effect described.

The present invention also relates to a depolarizing composition containing artificial pyrolusite for use in the manufacture of dry batteries.

The products commercialized for that purpose which are added to some extent (for example 5–50%, calculated on the amount of natural pyrolusite) to natural pyrolusite, and which emanate exclusively from the waste sludges of saccharin manufacture, contain about 60 to 80% by weight $MnO_2$ and about 8 to 15% by weight water, and have a bulk density of about 0.6 to 1.0. The bulk density is considerably predetermined by the precipitating conditions used in saccharin manufacture. Products having a relatively low bulk density have not been used hitherto for making batteries. Their being used would be contrary to experience which teaches that a product of low bulk density generally consists of very fine particles. It is known that the transport of substance and current in the so-called bobbins is considerably impeded by such finely divided products due to handicapped diffusion. Such impeded diffusion involves a considerable power loss of the cells, especially in the case of hard discharges. It was also feared that the use of products having so low a bulk density would further involve a power loss of the cells due to less pyrolusite being introduced into a bobbin having certain geometrical dimensions. As already proposed above, the artificial pyrolusite to be used may be a product precipitated from manganese salt solutions with the aid of an oxidizing or reducing agent and dehydrated with constant mixing and/or fine division to a water content of 15 to 35% by weight. It has been observed, however, that although the batteries produced with such product generally have a considerably increased capacity, the capacity increase was not always equally good when pyrolusites having the same water content were used.

It has now unexpectedly been found that the cell efficiency depends on the bulk density of pyrolusite having a certain water content. Artificial pyrolusites having a bulk density of between about 0.5 and 0.25 g./cm.$^3$, preferably 0.42 to 0.30 g./cm.$^3$ lead to especially good results, whereas pyrolusites having a bulk density lower than described above produce the above-mentioned difficulties due to impeded diffusion.

It is especially advantageous to use a pyrolusite containing 15 to 35%, preferably 18 to 25%, and advantageously 20 to 23%, water, the water being fairly distributed over the whole surface of the powder, including the outer and inner surfaces. In spite of their high water content, the pyrolusites have a completely dry dust like handle if their surface is sufficiently large. The pyrolusites should contain between about 40 and 50% manganese, and the ratio of oxygen to manganese should correspond to the composition of $MnO_{1.7}$ to $MnO_{2.0}$.

The artificial pyrolusites used in this invention which are characterized by their bulk density within the range of 0.5 and 0.25 g./cm.$^3$ can be obtained, for example, as follows: the pyrolusite is precipitated from a manganese salt solution by means of a hypochlorite solution at the neutral point, the pyrolusite separated from its mother liquor is treated for several hours in suspended from with a dilute acid of about 1 to 3% strength, the filter cake is intensely washed and dehydrated, while finely dividing and constantly mixing it, to a water content of 15 to 30% by weight, preferably 20 to 23% by weight. Processes other than described above can also be used.

The use of the artificial pyrolusites according to this invention as a depolarizing composition in a battery offers the advantage that a cell of a given dimension deliveries a greater number of ampère hours than a cell in which a customary product is used as a depolarizing agent.

This fact is illustrated in FIG. 4 of the accompanying drawing which illustrates the discharge curves of cells prepared (a) with a product having a bulk density such as set forth in this invention, i.e. of about 0.38 g./cm.$^3$ (curve I) and (b) with a product having a bulk density greater than indicated herein, i.e. of 0.76 g./cm.$^3$ (curve II). The electrolyte used was based on ammonium chloride. The share of the electrolyte in percent in the bobbin composition and the water content thereof was the same in either case. The two curves represent mean discharge curves (voltage-time-curves) in each case of three cells of identical type. The average capacity in ampère hours indicated in the drawings refers as usual to the voltage drop down to the limit voltage of 0.75 volt.

The advantage offered by the present invention is actually still more outstanding since artificial pyrolusites having a low bulk density produce depolarizing compositions lower in weight for a given volume than depolarizing compositions prepared with products of high bulk density. This fact is demonstrated in Table I below which indicates the bobbin weights of 10 bobbins, respectively, prepared (a) with an artificial pyrolusite according to this invention and (b) with customary commercialized artificial pyrolusite experienced to be of first quality.

*Table I*

| Type of artificial pyrolusite: | Weight of 10 bobbins each, grams |
|---|---|
| Product of invention | 87 |
| Product of invention | 89 |
| Product of invention | 88.5 |
| Product of invention | 88 |
| Commercial product | 93 |
| Commercial product | 92 |

The influence of the water content is illustrated in FIG. 5 of the accompanying drawing. FIG. 5 again illustrates the mean discharge curves of 3 cells, respectively, which have been prepared (a) with an artificial pyrolusite having a bulk density of 0.36 g./cm.$^3$ and a water content of 18.0% (curve I) and (b) with a pyrolusite having the same bulk density but a water content of 23.0% curve II. For the purpose of better comparison FIG. 5 also illustrates the discharge course of cells prepared with an artificial pyrolusite containing as little as 14% water (curve III).

The products used in accordance with this invention for making bobbin compositions generally contain about 40 to 50% manganese and about 10 to 18% active oxygen.

The products of this invention are used in admixture with natural pyrolusite and/or electrolyte pyrolusite for the manufacture of depolarizing compositions, the ratio of the natural and/or electrolyte pyrolusite to the artificial pyrolusite being a function of the type and design of the battery.

More particularly, the invention relates to the dehydration of artificial pyrolusite while constantly mixing and/or finely dividing it, the artificial pyrolusite being first precipitated by chemical means, for example in the form of a paste or a filter cake from a manganese salt solution while using an oxidizing or reducing agent. The precipitated pyrolusite used as starting material may contain more than 23% by weight water. The pyrolusite is advantageously dehydrated to a water content of about 15 to 35% by weight, preferably 20 to 23% by weight.

During the dehydration, the pyrolusite should be kept by thermal treatment at a temperature below about 150° C., preferably below 120° C. but at least at 65° C. under atmospheric pressure. When the dehydration is carried out under reduced pressure, for example under a pressure within the range of about 10 to 500 mm. mercury, the temperatures should be maintained at about 10 to 70° C. The dehydration is advantageously carried out for a period of about ½ to 10 hours. The apparatus used for dehydration is advantageously a drum drier type apparatus, into which the substance to be dehydrated is introduced together with a grinding auxiliary, for example porcelain balls.

The artificial pyrolusite may be dehydrated initially to a water content of about 15%, and then aftertreated and thereby readjusted to a water content of about 15 to 35% by weight, preferably 20 to 23% by weight. The aftertreatment is suitably carried out while using steam or a steam-containing gas.

The pyrolusite used as starting material is preferably obtained by oxidizing a solution of bivalent manganese compounds with chlorine or a hypochlorite at a pH of about 5 to 9, advantageously 7 to 8.

The invention also comprises the use of a mixture of natural pyrolusite and/or electrolyte pyrolusite with an artificial pyrolusite prepared by the process of this invention for the manufacture of depolarizing compositions for use in dry batteries. These depolarizing compositions are characterized by the fact that the artificial pyrolusite used for making them contains about 15 to about 35% by weight water. The artificial pyrolusite used according to this invention has a bulk density within the range of about 0.5 to 0.25 g./cm.$^3$, preferably 0.42 to 0.3 g./cm.$^3$, a surface of about 70 to 200 m.$^2$/g., and preferably contains about 40 to 53% by weight, advantageously 45 to 50% by weight, manganese.

The process used for making artificial pyrolusite having the above-mentioned bulk density is carried out, for example, as follows: an artificial pyrolusite precipitated at a pH-value of about 7 from a manganese salt solution while using a hypochlorite solution as the precipitating means is first separated from its mother liquor, if desired suspended for some hours in a dilute, preferably a 1 to 3% acid, and intensely washed, and then dehydrated with continuous mixing and/or fine comminution and division, the means and the period of time used for dividing the pyrolusite being so selected that the desired bulk density is obtained.

We claim:
1. A dry cell battery including a depolarizing composition comprising a substance selected from the group consisting of natural pyrolusite, electrolyte pyrolusite, and mixtures thereof, and an artificial pyrolusite having a water content within the range of about 15 to 35% by weight and a bulk density within the range of about 0.5 to 0.25 g./cm.$^3$.

2. A dry cell battery as claimed in claim 1, wherein the artificial pyrolusite has a bulk density within the range of 0.42 to 0.3 g./cm.$^3$.

3. A dry cell battery as claimed in claim 1, wherein the artificial pyrolusite has a surface of about 70 to 200 m.$^2$/gram.

4. A dry cell battery as claimed in claim 1, wherein the artificial pyrolusite contains about 40 to 53% by weight manganese.

5. A dry cell battery as claimed in claim 4, wherein the artificial pyrolusite contains about 45 to 50% by weight manganese.

References Cited by the Examiner
UNITED STATES PATENTS

| | | | |
|---|---|---|---|
| 2,473,563 | 6/1949 | Beja et al. | 23—145 |
| 2,608,466 | 8/1952 | Fox | 136—138 |
| 2,758,012 | 8/1956 | Welsh et al. | 136—138 |
| 2,956,860 | 10/1960 | Welsh | 23—145 |

ALLEN B. CURTIS, *Primary Examiner.*

JOHN H. MACK, WINSTON A. DOUGLAS, *Examiners.*